(12) United States Patent
Kremer et al.

(10) Patent No.: US 12,360,800 B2
(45) Date of Patent: Jul. 15, 2025

(54) DISTRIBUTED ATTRIBUTE BASED ACCESS CONTROL AS MEANS OF DATA PROTECTION AND COLLABORATION IN SENSITIVE (PERSONAL) DIGITAL RECORD AND ACTIVITY TRAIL INVESTIGATIONS

(71) Applicant: Proofpoint, Inc., Sunnyvale, CA (US)

(72) Inventors: Alexander Kremer, Lexington, MA (US); Tamir Pivnik, Nahariya (IL)

(73) Assignee: Proofpoint, Inc., Sunnyvale, CA (US)

( * ) Notice: Subject to any disclaimer, the term of this patent is extended or adjusted under 35 U.S.C. 154(b) by 539 days.

(21) Appl. No.: 17/760,791

(22) PCT Filed: Sep. 22, 2020

(86) PCT No.: PCT/US2020/051939
§ 371 (c)(1),
(2) Date: Mar. 16, 2022

(87) PCT Pub. No.: WO2021/055989
PCT Pub. Date: Mar. 25, 2021

(65) Prior Publication Data
US 2022/0334869 A1 Oct. 20, 2022

Related U.S. Application Data

(60) Provisional application No. 62/903,853, filed on Sep. 22, 2019.

(51) Int. Cl.
*G06F 9/46* (2006.01)
*G06F 9/50* (2006.01)
*G06F 9/54* (2006.01)

(52) U.S. Cl.
CPC ............ *G06F 9/468* (2013.01); *G06F 9/5011* (2013.01); *G06F 9/541* (2013.01)

(58) Field of Classification Search
USPC .......................................................... 726/21
See application file for complete search history.

(56) References Cited

U.S. PATENT DOCUMENTS 10,042,618 B1 * 8/2018 Hulbert ..................... G06F 8/71
10,530,760 B2 * 1/2020 Beck ....................... G16H 50/20
(Continued)

OTHER PUBLICATIONS

International Search Report for PCT/US20/51939 mailed Jan. 12, 2021.

*Primary Examiner* — Sakinah White Taylor
(74) *Attorney, Agent, or Firm* — Sheehan Phinney Bass & Green PA

(57) ABSTRACT

A distributed system provides access by a principal to a resource associated with sensitive data. Micro-services in communication with an authorization engine each include a resource provider that receives a resource action request from the principal to access the resource, determines a context for the request, and transmits the context to the authorization engine in an authorization request. The authorization engine receives the authorization request, resolves the authorization request context against a plurality of pre-defined resource conditions, and responds to the resource provider with an authorization response of allow, deny, or allow-with-conditions. The context for the request includes metadata regarding attributes of the principal, and each of the resource conditions includes a logical expression operating upon the attributes.

8 Claims, 5 Drawing Sheets

(56) References Cited

U.S. PATENT DOCUMENTS

| | | | |
|---|---|---|---|
| 2008/0294586 A1* | 11/2008 | Lim | H04L 63/20 |
| | | | 726/4 |
| 2012/0060207 A1* | 3/2012 | Mardikar | H04L 63/20 |
| | | | 726/4 |
| 2019/0227856 A1* | 7/2019 | Xu | G06F 9/541 |
| 2019/0272195 A1* | 9/2019 | Hsu | G06F 9/468 |
| 2019/0273746 A1 | 9/2019 | Coffing | |

* cited by examiner

DISTRIBUTED ATTRIBUTE BASED ACCESS CONTROL AS MEANS OF DATA PROTECTION AND COLLABORATION IN SENSITIVE (PERSONAL) DIGITAL RECORD AND ACTIVITY TRAIL INVESTIGATIONS

CROSS-REFERENCE TO RELATED APPLICATIONS

This application is a national stage entry of PCT Application No. PCT/US20/51939, filed Sep. 22, 2020 and entitled "Distributed Attribute Based Access Control as means of Data Protection and Collaboration in Sensitive (Personal) Digital Record and Activity Trail Investigations", which claims the benefit of U.S. Provisional Patent Application Ser. No. 62/903,853, filed Sep. 22, 2019, entitled "Distributed Attribute Based Access Control as means of Data Protection and Collaboration in Sensitive (Personal) Digital Record and Activity Trail Investigations," both of which are incorporated by reference herein in their entirety.

FIELD OF THE INVENTION

The present invention relates to data access, and more particularly, is related to a system and method for providing controlled access to sensitive data.

BACKGROUND OF THE INVENTION

Systems that store sensitive personal information usually use either Discretionary Access Control (DAC) or Role Based Access Control (RBAC). These methods define access rights granted to individuals or groups either directly or through roles defining (listing) which resources are accessible to people having different roles.

These approaches may be appropriate for controlling access to resources storing information in records with a restricted number of unique identifiers by which resources or groups of resources can be uniquely defined, for example, by social security numbers (SSN) as part of an access control scheme. In such systems there is also generally a chain of privileges, in which explicit access privileges to particular resources are assigned to a role, person or a group. The list usually consists of items in form of:

<role/person/group, access-right (read, write, modify, . . . ), resource-identifier>

However, in some contexts such as detection of unauthorized or suspicious data access, large quantities of data may be accessed in the form of user activity telemetry. The telemetry includes many items without a clear and unique resource-identifier upon which access privileges can be expressed in the above form, such as endpoint telemetry including operating system and user interface activity related to end user actions. Examples of such activity include:

- launching an application with application process details such as name, path, process ID, among others,
- copying, renaming, deleting a file with file attributes such as name, path, ownership, and
- uploading/copying a file to a website, USB device, or a network drive.

In addition, this telemetry generally includes a "context" reference identifying the endpoint, user, agent, remote access details, etc.

Other types of telemetry that may be considered for determining access include:

- physical security card in/out, including facility, room, and other relevant information, and
- human resources related events, such as change of role within an organization or time window, such as a 15-day notice event.

Furthermore, the sensitivity of the data in terms of its confidentiality and privacy involves defining the scope of telemetry that may be reviewable in an investigation. Therefore, there is a need in the industry to address one or more of the above described shortcomings.

SUMMARY OF THE INVENTION

Embodiments of the present invention provide distributed attribute-based access control as means of data protection and collaboration in sensitive (personal) digital record and activity trail investigations. Briefly described, the present invention is directed to a distributed system that provides access by a principal to a resource associated with sensitive data. Micro-services in communication with an authorization engine each include a resource provider that receives a resource action request from the principal to access the resource, determines a context for the request, and transmits the context to the authorization engine in an authorization request. The authorization engine receives the authorization request, resolves the authorization request context against a plurality of pre-defined resource conditions, and responds to the resource provider with an authorization response of allow, deny, or allow-with-conditions. The context for the request includes metadata regarding attributes of the principal, and each of the resource conditions includes a logical expression operating upon the attributes.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
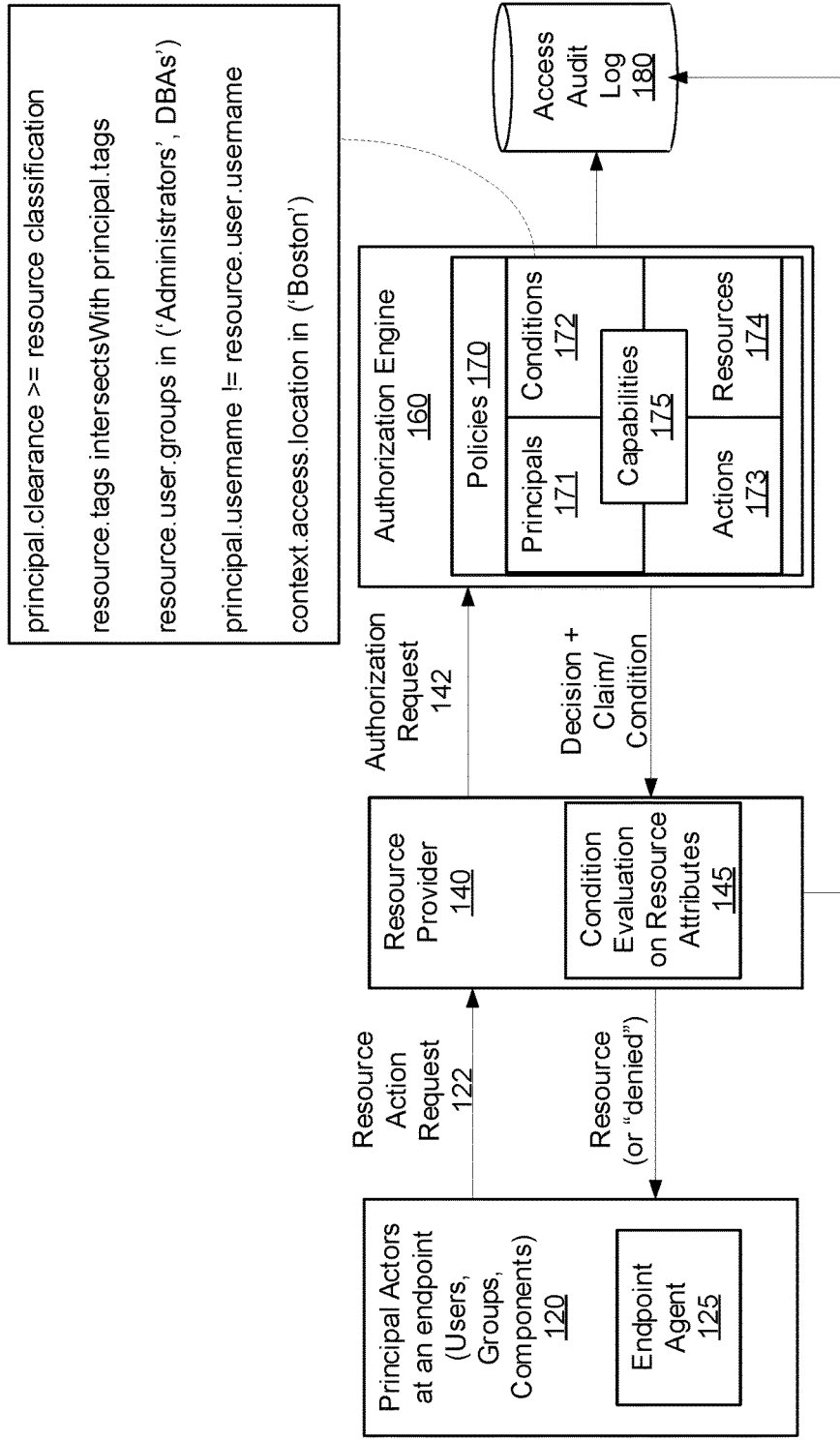
FIG. 1 is a schematic diagram of a first exemplary embodiment of a system for distributed based access control.

The following definitions are useful for interpreting terms applied to features of the embodiments disclosed herein, and are meant only to define elements within the disclosure.

As used within this disclosure, "Discretionary Access Control (DAC)" refers to a method of providing access to a data object based on the identity of the user requesting access. For example, a DAC may be implemented by a list of users granted access by username and/or ID.

As used within this disclosure, "Role Based Access Control (RBAC)" refers to a method of providing access to a data object based on the role of the user requesting access. For example, an RBAC may be implemented by taking a username/ID as input to look up roles and/or groups of the user and determining whether one or more role/group has been granted access the object.

As used within this disclosure, "attribute based access control (ABAC)" (also referred to as "policy based access control"), refers to control access by a principal to a data asset ("resource") based on attributes beyond merely identity, role, and group membership of the principal. ABAC may be used for control of:
Principals/Subjects requesting access to sensitive information (e.g. Users),
Resources/Objects being accessed (e.g. Documents or Personal Records), and
Context of access (including time of day, geo location, etc.).

As used within this disclosure, a "resource" refers to sensitive data and/or an entity, for example, an application, including and/or providing access to sensitive data.

As used within this disclosure an "attribute" refers to information regarding a principal seeking access to a resource used to provide information regarding the principal, for example, but not limited to an identity and/or role of the principal, an activity related to the resource request, and/or other context related to the access to the resource.

As used within this disclosure, "sensitive data" refers to any computer accessible information and/or process identified by an administrator of an information system and/or network for which access is to be conditionally restricted and/or controlled.

As used within this disclosure, "telemetry" refers to the process of monitoring, collecting, and/or analyzing data regarding computer and/or system use to track user activity in a networked device, for example, to determine inappropriate or potentially harmful access to and/or use of system resources. Telemetry may involve the collection of measurements or other data at remote points ("endpoints") and their automatic transmission to receiving equipment for monitoring. The telemetry may be collected by an agent installed at the endpoint working in conjunction with the operating system of the endpoint computer/system to monitor user activity such as data usage (bandwidth), file/resource access, internet activity, process execution, mouse/keypad movements and clicks, and/or use of external devices (such as USB drives), among others.

As used within this disclosure "endpoints" refer to workstations and servers, for example, workstations and servers of a customer of a resource provider.

As used within this disclosure "micro-service architecture" refers to a variant of the service-oriented architecture (SOA) structural style. This architecture arranges an application as a collection of loosely coupled services. In a micro-services architecture, services typically have a fine grained set of functionalities and the communication protocols between them are lightweight.

As used within this disclosure, a "principal" or a "principal actor" is any entity (application, user, service, etc.) acting on a system. Principals have unique identities recognized by the system and used as part the authorization process. In the context of authorization decisions principals are sometimes referred to as "subjects" to express an action on the system in terms of language sentence structure "subject, predicate, object", which are equivalent to "principal, action, resource".

As used within this disclosure, a "resource provider" refers to a Software as a System (SaaS) application interface (API), for example, a micro-service API. When a principal attempts to access a system resource via the API, the resource provider is configured to generate an authorization request to determine whether the principal is authorized to access the resource.

As used within this disclosure, a "context" for a resource access request refers to data and/or a reference identifying metadata associated with attributes of an entity requesting the access (the principal) and/or information regarding a scenario for the request, for example but not limited to, an identity of an endpoint originating the request, an identity of the requesting principal, and/or telemetry data associated with the principal/endpoint, and/or an activity of the principal while or before requesting access, among other information. The context may be used, for example, to determine whether or not allow access to the requested resource.

As used within this disclosure, a "condition" refers to a logical expression operating upon one or more attributes related to a principal requesting access to sensitive data.

As used within this disclosure, "resolve" or "resolving" refers to the action of determining whether all of the one or more attributes associated with a condition satisfy the condition. For example, a condition is generally considered resolved if the aggregate result of the logical expression of the condition when applied to the associated attributes is TRUE.

As used within this disclosure, "JavaScript Object Notation (JSON)" refers to a lightweight format for storing and transporting data. JSON is often used when data is sent from a server to a web page.

As used within this disclosure, "Hypertext Transfer Protocol (HTTP)" refers to the well-known application layer communication protocol for distributed hypermedia information systems and is the communication foundation of the World Wide Web.

As used within this disclosure, a "JSON Web Token (JWT)" refers to an open standard (RFC 7519) that defines a compact and self-contained way for securely transmitting information between parties as a JSON object. This information can be verified and trusted because it is digitally signed. JWTs can be signed using a secret (with the HMAC algorithm) or a public/private key pair using RSA or ECDSA.

As used within this disclosure, "jti" refers to a JWT ID claim providing a unique identifier for an associated JWT. The identifier value is assigned in a manner that ensures that there is a negligible probability that the same value will be accidentally assigned to a different data object; if the application uses multiple issuers, collisions MUST be prevented among values produced by different issuers as well. The "jti" claim can be used to prevent the JWT from being replayed. The "jti" value is a case-sensitive string.

Reference will now be made in detail to embodiments of the present invention, examples of which are illustrated in the accompanying drawings. Wherever possible, the same reference numbers are used in the drawings and the description to refer to the same or like parts.

As described further in the embodiments herein, attribute based access control (ABAC) is a paradigm of access control, that includes one or more computer-based methods implemented in a computer-based system, granting rights based on conditions that combine attributes into logical expressions. The attributes of the principal seeking access must agree with the attributes assigned to the object being accessed. Attributes in those conditions can belong to any entity involved in the activity requesting access rights, including (but not limited to):

Principals/Subjects requesting access to sensitive information (e.g. Users).

Resources/Objects being accessed (e.g. Documents or Personal Records).

Context of access (including time of day, geo location, etc.).

For example, conditions on attributes may include:

Activity events of users not belonging to a Database Administrators group, using a set of Data Base Administration Tools.

Activity events of on production wired and/or wireless networks (defined by activity endpoint network addresses) involving any web browsing activity.

Activity events tagged with one of the investigation case numbers that the investigator (principal) herself is tagged with (i.e. assigned to investigate).

Activity events where the username is not the same as the investigator username (investigators cannot see their own events).

Under exemplary embodiments described herein, an ABAC mechanism, which may be a distributed ABAC (DABAC), implements a set of restrictions on access to data through micro-service APIs based on properties of the entities including properties on telemetry data associated with the principal seeking access.

A SaaS provider, for example, an insider threat management (ITM) platform implements its functionality as a set of micro-service (following the micro-service architecture paradigms and best practices for example, as described at https://en.wikipedia.org/wiki/Microservices). Each micro-service exposes its functionality through a set of representational state transfer (REST) APIs (https://en.wikipedia.org/wiki/Representational_state_transfer). This allows the embodiments to define datasets including complex logical expressions on attributes of the data as well as restrictions on access patterns based on geolocation to satisfy regional privacy and data sovereignty regulations.

Under the embodiments, restriction on investigative access to data can be defined as strictly as desired. For example, an investigator may access only activities involving observed users that have been flagged as part of an investigation, contain use of specific internal applications and have been performed on servers that have access to sensitive information through those applications.

In some implementations, the embodiments disclosed herein may be used in connection with any Sensitive Digital Record or Trail/Log regardless of its nature or origin and/or for any purpose of access (not only investigations).

As shown by FIG. 1, under an exemplary first embodiment 100 of the present invention, a plurality of SaaS micro-services provides access to resources through a set of representational state transfer (REST) Application Programming Interfaces (APIs), referred to herein as resource providers 140. Each API item is identified as an action. In a micro-service environment, each REST API enables retrieval, creation, modification, deletion, or other actions on the system. Examples of such APIs signatures and related action encodings include:

1. Addition/logging of an audit event in the system. Here, the action is encoded as "audit:logEvent" and enabled through a REST API with the following HTTP signature:
   POST/apis/audit/events followed by a body describing information about an event to be created/logged.
2. Retrieval of previously logged events. Here the action is encoded as "audit:getEventSet" and enabled through a REST API with a following HTTP signature:
   GET/apis/audit/events Authentication information such as principal's unique identifier is usually included within each REST API request. The API signature may use standard methods such as "Authorization" HTTP header and authentication payloads in form of signed JWT to carry authentication information. Such signed JWTs may be obtained by the principal ahead of API requests, using standard authentication protocols, including supplying username and password, standard OAuth2 or SAML2 flows, etc.

Principals 120 (Roles, Users, Groups, Other Micro-services, 3rd Party Applications, etc.) include identified actors requesting access to sensitive data from a resource provider 140. For example, the resource provider 140 may have a log of security audit telemetry events collected from various data sources.

The principal 120 requests a resource action 122, such as "audit:getEventSet" by attempting to access the resource via the resource provider 140 API, such as GET/apis/audit/events for the resource associated with the request.

Upon receiving the request, the resource provider 140 prepares the information required for an authorization request 142 to the Authorization Engine 160. Examples of this information include, but are not limited to:

Action requested, such as "audit:getEventSet."

Principal/subject information (such as Principal's unique identifier) obtained from the JWT or other authentication method.

A resource identifier, such as a unique identifier of a resource requested or if a non-qualified set of resources is requested like in the case of audit:getEventSet, it can designate it as "any" or wildcard "*". Note that under this embodiment full information about resource attributes is never included (as it may involve a large multitude of data and would deem it unfeasible). Instead a distributed evaluation model is proposed outlined below.

Access context information, such as a remote endpoint IP (Internet Address) or estimated geolocation (e.g. country code from which the request was made)

The resource provider 140 sends the prepared authorization request 142 to the Authorization Engine 160.

In order to process an authorization request 142, under the first embodiment, an authorization engine 160 maintains a database of policies 170 binding data on principals 171 to actions 173 on resources 174 valid only under defined conditions 172. Conditions 172 are arbitrarily complex logical expressions on attributes of all the entities (principals 171, actions 173 on resources 174) involved.

An example of such a condition is

```
#ExampleA
principal.clearance >= resource.classification
AND principal.username != resource.user.username
AND resource.endpoint.ip in ('192.168.1.0/24')
AND context.access.location in ('Boston')
```

This example encodes that any principal assigned to access resources (for example audit log events) also has to have clearance above or equal the classification of the resource item, they cannot see their own data, the data is associated with endpoint with IP in 192.168.1.0/24 subnet, and they are accessing the information from "Boston".

The authorization engine 160 receives the authorization request 142 for a resource from the resource provider 140 and attempts to resolve the authorization request 142 against conditions associated with the resource. The authorization engine 160 may generate one of three responses: allow, deny, or allow-with-conditions based on the following evaluation:

1. If the authorization engine 160 determines that the principal 120 specified in the authorization request 142 has at least one associated policy among the defined policies 170, granting (allowing) the principal 120 the right to execute the action specified in the authorization request 142 on a resource specified in authorization request 142, AND that there are no conditions associated with any of the policies granting the principal 120 the right to execute the specified action, the authorization engine 160 provides an affirmative decision ("allow") to the resource provider 140. Here, upon receiving the response from the Authorization Engine 160, the resource provider 140 provides the requested resource to the principal 120.

2. If the authorization engine 160 determines that the principal 120 specified in the authorization request 142 has no policies granting the principal right to perform the specified action are defined in 170, the authorization engine provides a negative decision ("deny") to the resource provider 140. Here, the resource provider 140 provides the principal 120 with an authorization error/"deny" response and does not provide the requested resource to the principal 120.

3. If the authorization engine 160 determines that the principal 120 specified in the authorization request 142 has one or more associated policies among policies defined in 170, granting (allowing) it the right to execute the action specified in the authorization request 142 on a resource specified in authorization request 142, but they have conditions associated with them, the Authorization Engine 160 determines that the principal specified in the authorization request 142 has "conditional rights" to perform the action specified in authorization request 142 on the resource specified in the authorization request 142. In this case the Authorization Engine 160 responds to resource provider 140 with "allow-with-conditions" decision and includes in the response a logical combination of conditions obtained from the policies granting the principal 120 authorization. Logical combination of conditions may involve logical disjunction (OR) between conditions obtained from multiple policies conditionally granting access. Here, the resource provider 140 applies additional restrictions on the data it returns to principal 120 based on rules specified in the conditions returned from the Authorization Engine 160 in its "allow-with-conditions" response.

Further enhancement to this model may include policies defined in 170, explicitly denying the principal right to execute the specified action, in which case those may have priority over policies "allowing" the principal right to execute the specified action.

The authorization engine 160 records the authorization request 142, the resulting decision, and a timestamp in an access audit log 180. Resolving the conditions 172 may include the authorization engine 160 accessing the access audit log 180 to base its access decision on items in the access audit log 180, for example, the frequency of access to a resource or a class of resources, the times of day of such accesses, the location of the principal at the time of the access, among other conditions.

In the instance of an "allow with conditions" decision, the resource provider 140 uses the provisional conditions provided by the authorization engine to perform a condition evaluation on the resource attributes 145, and accordingly provides either a "deny" response to the principal 120 or provides the resource to the principal 120.

Under this embodiment, a method to distribute evaluation of conditions may involve a templating engine allowing an evaluation of conditions such as the one outlined in #ExampleA above. The templating engine fully or partially resolves the information based on inputs provided. In this case the authorization engine 160 has access to full information (all attributes) on the principal and on the context specified, but no information on the resource attributes apart for optionally a resource unique identifier. Let us examine a template resolution as part of authorization engine 160 of the ExampleA above, assuming the following information about the principal and the context:

The principal 120 specified in authorization request 142 has the following attributes:
username="helen"
clearance=3 (confidential)
The context of access has:
location="Boston"

In this case the templating engine resolves the condition from ExampleA above to

---

ExampleA.R - Partially Resolved Condition
3 >= resource.classification
AND 'helen' != resource.user.username
AND resource.endpoint.ip in ('192.168.1.0/24')
AND 'Boston' in ('Boston')

---

When such a partially evaluated condition is returned to the resource provider 140 as part of the "allow-with-conditions" response from authorization engine 160, the condition may be resolved in several ways, for example:

Matching criteria on attributes of an input (in API requests supplying inputs—e.g. new audit event deposited in the event log).

Applying a filter on a database query to retrieve information (e.g. any event in an audit log matching the condition (i.e. allowed by the principal to be seen). An exemplary translation of the condition above to SQL for a relational database would be:

---

SELECT * FROM audit_events AS resource
WHERE (3 >= resource.classification) AND
(ip_address_match(resource.endpoint->ip in
('192.168.1.0/24') AND ('Boston' in ('Boston'))

---

An advantage of this two-part evaluation (part-1 in the authorization engine 160 and part-2 in the resource provider 140) is that only minimal information needs to be carried in the authorization request 142, while allowing authorization of access and restricted visibility on resources with a potential cardinality in the many billions, by further distributing resulting queries over databases partitioned by resource attributes used in conditions.

Additional optimization of the approach above includes logical trimming of resolvable logical expressions. In #ExampleA.R, above, the term 'Boston' in ('Boston') could have been evaluated to true as part of the template resolution within the Authorization Engine 160 and not passed in the response to the resource provider 140. Furthermore, in certain situations where the resource part of the condition is absent conditions associated with the access policy, the whole condition may be evaluated and reduced to "true" or "false", allowing, in certain situations, the response to be turned from "allow-with-conditions" to a simple "allow" or "deny" response.

Figure 2:
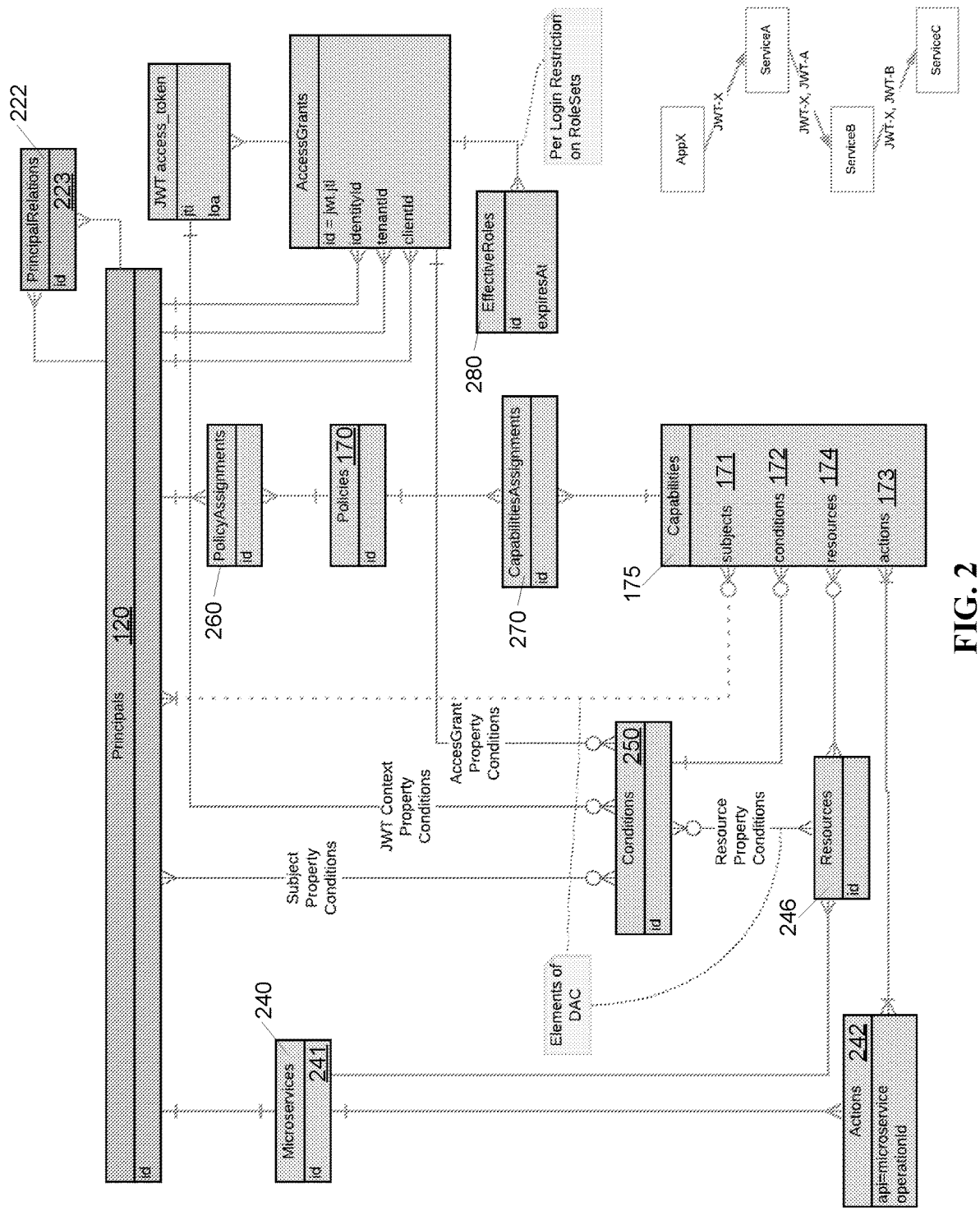
FIG. 2 is a schematic diagram of a data model for the authorization engine of FIG. 1.

FIG. 2 is a schematic diagram of a data model for the authorization engine 160 of FIG. 1, enabling the authorization engine 160 to resolve authorization requests 142. A plurality of principals 120 may each have a plurality of principal relations 222, with each principal relation 222 having an associated ID 223. The principal 120 interacts with a micro-service 240 having a micro-service ID 241 via a resource provider 140 (FIG. 1). The resource provider provides a resource action request 122 (FIG. 1) indicating a desired resource 246 to be accessed and one or more resource actions 242 associated with the resource 246. The authorization engine 160 associates the resources and actions received in the resource action request with resources 174 and actions 173 of the policy capabilities 175 of the authorization engine 160. The authorization engine 160 likewise associates principals 120 with subjects 171 of the policy capabilities 175.

Each of the resources 246 is associated with a plurality of conditions 250, and the authorization engine 160 associates the conditions 250 principals 120 with conditions 172 of the policy capabilities 175.

Conditions (as described above) represent logical expressions on attributes of principals, resources, and context to impose attribute based restrictions on any action to which they are attached.

Capabilities 175 include associations of:
  Conditions 173/250—logical expressions on attributes of principals, resources, and context, such as those outlined in ExampleA above.
  Resources 174/246 (specified by individual resource identifiers or generalized as "any" or wildcard "*").
  Actions 173/242 (such as audit:getEventSet mentioned above, and meaningful to resource providers 140 implemented as micro-services 241).
  Optional Principals/Subjects 171/120, such as Users, Groups, Services, Devices or Applications. Optional principal direct association with a capability allows for definitions of "resource assignments" a form of Discretionary Access Control by granting specified principal access to specific resources.

Capabilities bind actions to resources and conditions to define specific access for execution of a specified action on the resources restricted by conditions. Policies 170 are logical grouping of Capabilities 175 formed by many-to-many relationship CapabilitiesAssignments 270. An example of a Policy 170 would be SecurityLogManagement, which may combine multiple capabilities granting access not only the particular API to access raw logs, but may include additional APIs to produce reports, delete logs, etc.

Principals may be bound to groups or roles through a self-referential many-to-many relationship PrincipalRelations 223. Each principal 120 may have a plurality of policy assignments 260 to polices 170 via many-to-many relationship PolicyAssignments 260

As an example of an authorization request processing to obtain associated policies and conditions, as outlined above, an authorization request includes the principal 120 requesting access, an action 173, an optional resource identifier 174, and an optional context (including contextual access information such as remote location, time of day, etc.).

The authorization engine 160 uses an optimized database implementing the data model outlined in FIG. 2 to find all assigned capabilities 175 associating the specified principal 120, action 173 and resource 174, by following the set of associations stored in PrincipalRelations, PolicyAssignments, and CapabilitiesAssignment. The resulting set of capabilities is then processed according to the template evaluation and logical combination outlined above in order to respond to the authorization request 142 and provide the resource provider 140 with an allow, deny, or allow-with-conditions response.

EffectiveRoles 280, as well as JWT access tokens and AccessGrants shown in FIG. 2 indicate the association of the authentication context of a principal 120 with the authorization data model depicted in the rest of FIG. 2. EffectiveRoles 280 may be used to provide temporary elevation of privilege by assuming authorization of another principal (e.g. role).

In an exemplary embodiment, a method provides discretionary data access control based on a plurality of properties/context of the data request, including the identity of the user and a plurality of criteria determined by the context of the data access request. Attributes may include, for example, location, time of day, and security clearance of the principal. An agent 125 (FIG. 1) resident in the endpoint of the principal, collects endpoint telemetry regarding actions of the principal. The authorization engine 160 matches these attributes against conditions attached to the data object access criteria. Example attributes include:
  Properties of the access (found in security logs of users and/or systems):
  ID of the endpoint (the requesting machine ID)
  Principal ID
  Group/organization the principal belongs to
  What type of activity (attributes):
    Web browsing
    Download
    Execution of some virus
    Metadata associated with the activity (for example provided by Google Drive or other cloud based storage).
  Time of event
    Time zone
  Endpoint information (gathered by endpoint agent)
    Network address
    Device
    Operating system
    Hostname
    Physical location This metadata is provided to the resource provider 140 (via its API) in the context of a principal's attempt to access the resource.

Generally, a principal actor 120 at an endpoint attempts to access one or more resources available through APIs in Resource Provider micro-services 140. The authorization request 142 includes identification of the principal 120, the context, and the action the resource provider 140 is providing. The authorization engine 160 finds the matching policies by the request parameters. If no matches are found— "DENY" is returned. If matches are found, but they are not conditional (i.e. no conditions are found as part of the policy matches), "ALLOW" is returned. If matches are found, but some of them are conditional, conditions are resolved for the data that the authorization engine is able to resolve (e.g. principal and context attributes). The authorization engine 160 responds to the Resource Provider with "ALLOW-WITH-CONDITIONS" and includes the remainder of the conditions carrying further restrictions (or claims) on the data that resource provider 140 is allowed to return. The resource provider 140 returns the response to the principal. If access granted is "ALLOW-WITH-CONDITIONS" then the resource provider 140 further filters/resolves the data returned.

Figure 3:
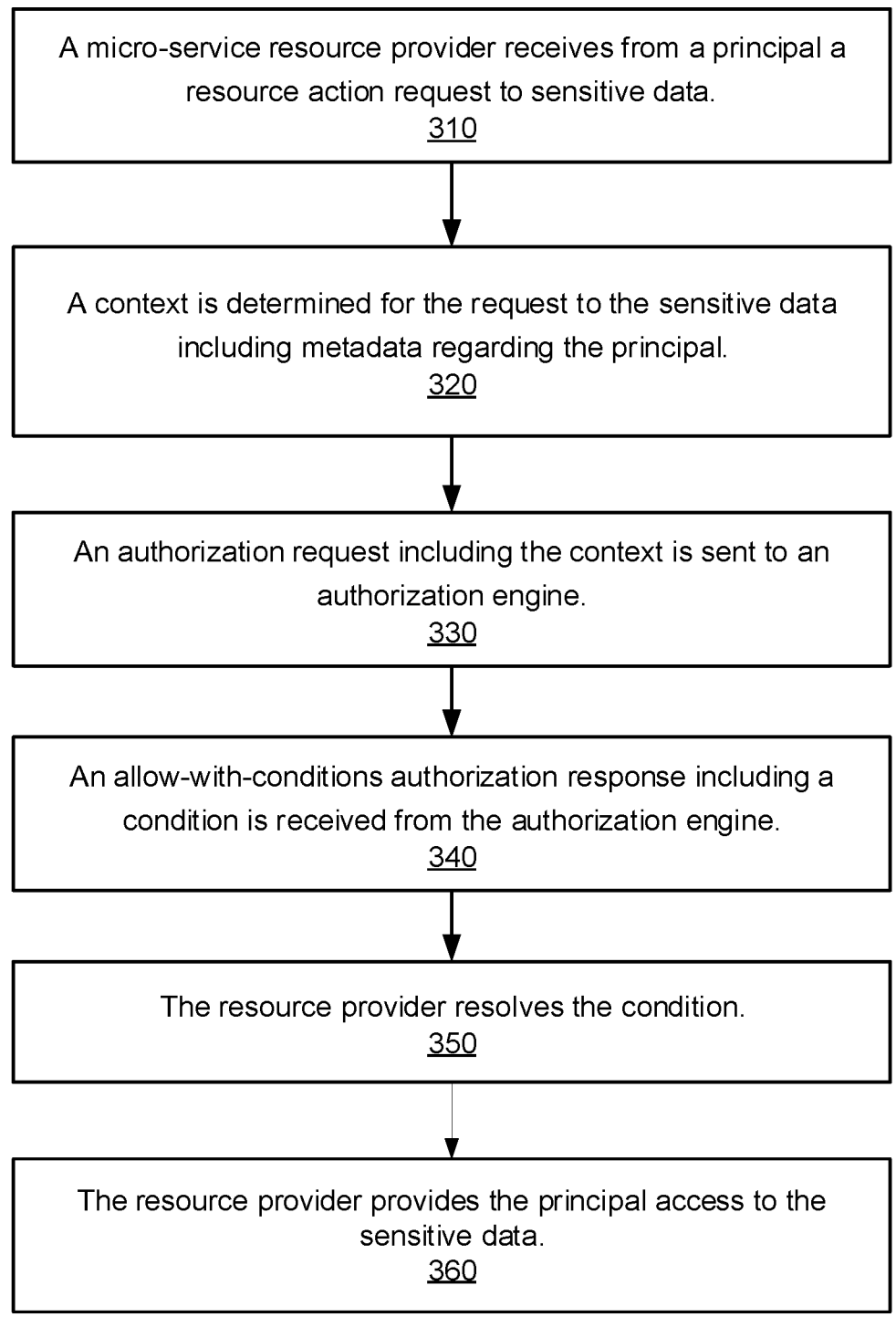
FIG. 3 is a flowchart of an exemplary embodiment of a method by a micro-service resource provider for controlling attribute based access by a principal to sensitive data.

FIG. 3 is a flowchart of an exemplary embodiment of a method 300 method by a micro-service resource provider in communication with an authorization engine via a communication network for controlling attribute based access by a principal to sensitive data. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to FIG. 1.

A micro-service resource provider 140 receives a resource action request to the sensitive data from a principal 120, as shown by block 310. A context is determined for the request to the sensitive data including metadata regarding the principal 120, for example, an action by the principal 120 associated with the resource action request, as shown by block 320. An authorization request including the context is sent by the resource provider 140 to an authorization engine 160, as shown by block 330. An allow-with-conditions authorization response including a condition is received from the authorization engine 160, as shown by block 340. The resource provider 140 resolves the condition, as shown by block 350. The resource provider 140 provides the principal 120 access to the sensitive data, as shown by block 360.

Figure 4:
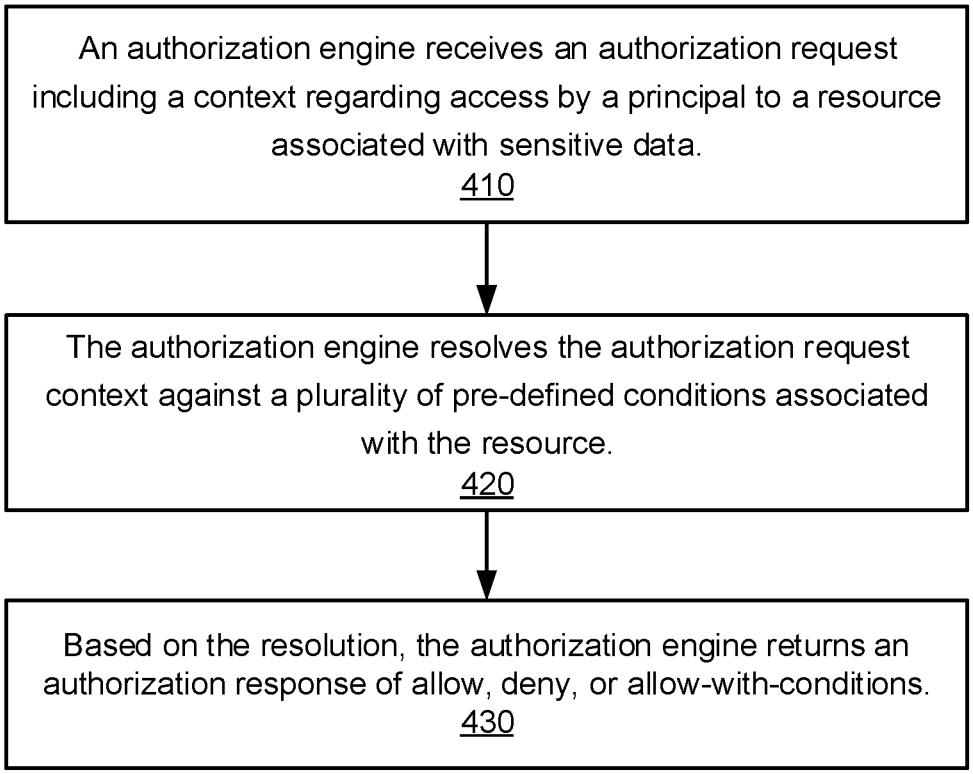
FIG. 4 is a flowchart of an exemplary embodiment of a method by an authorization engine for controlling attribute based access by a principal to sensitive data.

FIG. 4 is a flowchart of an exemplary embodiment of a method 400 method by an authorization engine in communication with a micro-service resource provider via a communication network for controlling attribute based access by a principal to sensitive data. The method is described with reference to FIG. 1.

An authorization engine 160 receives from a resource provider 140 an authorization request including a context for the authorization request regarding access by a principal 120 to a resource associated with sensitive data, as shown by block 410. The authorization engine 160 resolves the authorization request context against a plurality of pre-defined conditions associated with the resource, as shown by block 420. The authorization engine 160 returns to the resource provider 140 an authorization response of allow, deny, or allow-with-conditions based on the resolution as shown by block 430.

Figure 5:
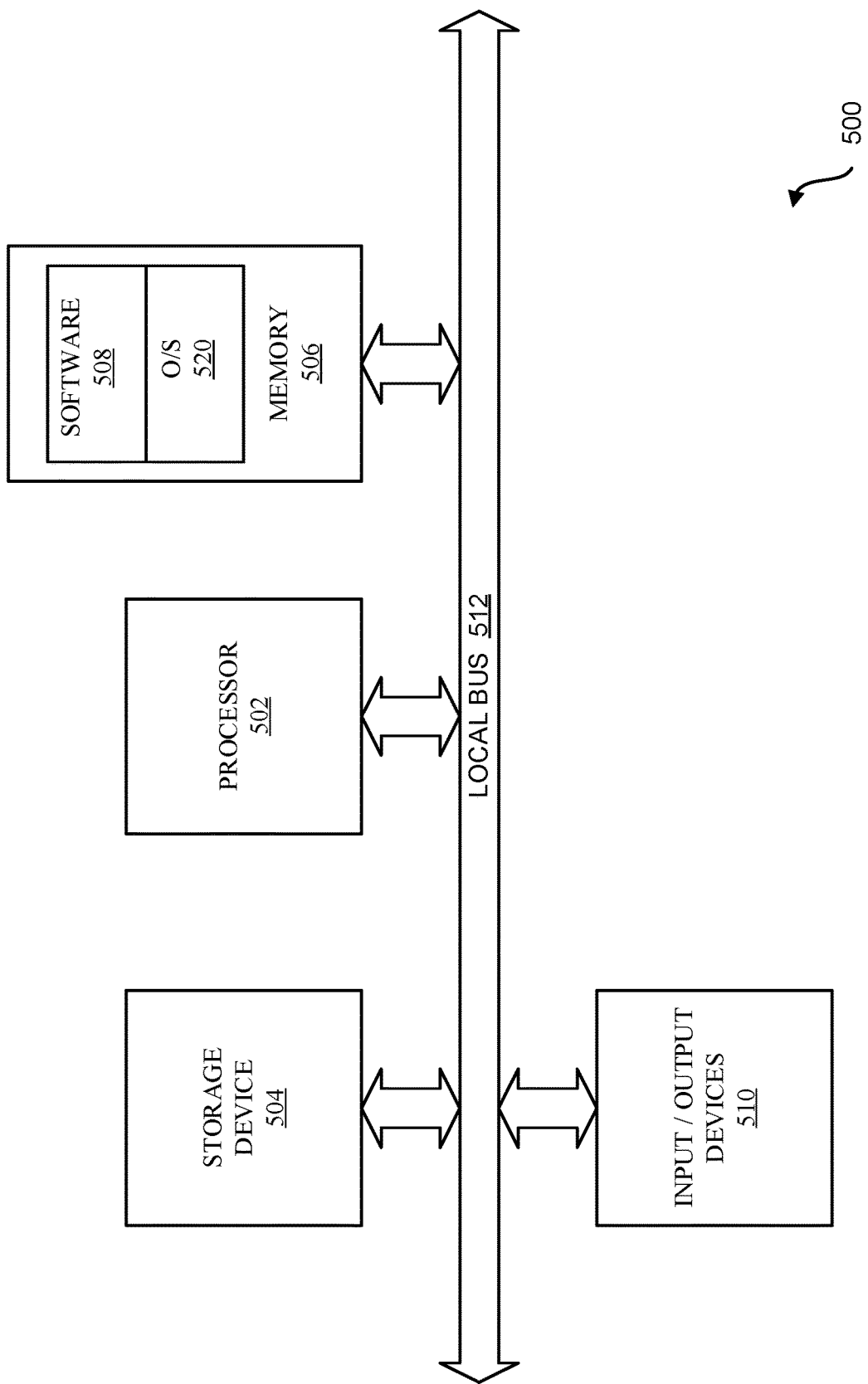
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 and the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The embodiments described above may be, or may be incorporated in, a practical application improving control of access to information that is proprietary to and or sensitive to an entity accessing a SaaS system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A distributed system in a communication network for attribute based access control providing a principal access to a resource comprising sensitive data, comprising:
   a plurality of computer-based micro-services in communication with an authorization engine executing on one or more hardware processors and memory, via the communication network, wherein each of the computer-based micro-services executes a resource provider application program interface (API) on the one or more hardware processors configured to:
   receive from the principal a resource action request to access the resource;
   determine an authorization request context for the resource action request to access the resource, the authorization request context comprising metadata regarding the principal and an action by the principal associated with the resource action request; and
   transmit to the authorization engine an authorization request comprising the authorization request context; and
   the authorization engine comprising a database of policies comprising principals, resources, actions upon resources, and conditions, each condition comprising a logical expression operating upon one or more attributes of the principals and actions upon resources, the authorization engine configured to:
   receive the authorization request;
   resolve the authorization request context against a plurality of the pre-defined conditions to determine an authorization response selected from the group of allow, deny, and allow-with-conditions by:
   searching the database for a policy with conditions matching the authorization request context;
   selecting an authorization response of "deny" when no matching policy is found;
   selecting an authorization response of "allow" when all found conditions are matching; and
   selecting an authorization response of "allow-with-conditions" when one or more found matching policy has further restrictions to be resolved by the resource provider API and all other found conditions are matching;
   record the authorization request, the authorization response, and a timestamp in an access audit log; and
   transmit the authorization response to the resource provider API,
   wherein the principal comprises an entity having a recognized identity used in an authorization process.

2. The system of claim 1, wherein resolving the authorization request context further comprises accessing the access audit log comprising metadata regarding previous attempts to access the sensitive data.

3. The system of claim 1, wherein the resource provider API is further configured to:
   receive, from the authorization engine, the allow-with-conditions authorization response comprising a condition of the plurality of pre-defined conditions;
   resolve the condition; and
   provide the principal access to the resource.

4. The system of claim 1, wherein the resource provider API is further configured to:
   receive, from the authorization engine the allow-with-conditions authorization response comprising a condition of the plurality of pre-defined conditions;
   fail to resolve the condition; and
   deny the principal access to the resource.

5. A computer-based method by an authorization engine executing on one or more hardware processors and memory, in communication with a computer-based micro-service resource that executes a resource provider application program interface (API) on the one or more hardware processors via a communication network for controlling attribute based access by a principal to a resource comprising sensitive data, the authorization engine comprising a database of policies comprising principals, resources, actions upon resources, and conditions, each condition comprising a logical expression operating upon one or more attributes of the principals and actions upon resources, the method comprising:

receiving an authorization request from the resource provider API comprising an authorization request context for the request for the resource;

resolving the authorization request context against a plurality of pre-defined conditions associated with the resource to determine an authorization response selected from the group of allow, deny, and allow-with-conditions by:

searching the database for a policy with conditions matching the authorization request context;

selecting an authorization response of "deny" when no matching policy is found;

selecting an authorization response of "allow" when all found conditions are matching; and selecting an authorization response of "allow-with-conditions" when one or more found matching policy has further restrictions to be resolved by the resource provider API and all other found conditions are matching;

recording the authorization request, the authorization response, and a timestamp in an access audit log; and transmitting to the resource provider API an authorization response of the group consisting of allow, deny, and allow-with-conditions, wherein the principal comprises an entity having a recognized identity used in an authorization process, the authorization request context for the request for the resource comprises metadata regarding a plurality of attributes of the principal and an action by the principal associated with the authorization request, and each of the plurality of conditions comprises a logical expression operating upon one or more attributes of the plurality of attributes.

6. The method of claim 5, wherein the allow-with-conditions authorization response comprises a condition of the plurality of pre-defined conditions that the authorization engine did not resolve.

7. The method of claim 5, wherein resolving the authorization request context further comprises accessing the access audit log.

8. The method of claim 5, wherein the authorization response comprises privileges providing access to the resource.

* * * * *